(12) United States Patent
Kawaguchi et al.

(10) Patent No.: US 8,044,165 B2
(45) Date of Patent: Oct. 25, 2011

(54) PROCESS FOR PRODUCING RESIN FOR OPTICAL MATERIAL

(75) Inventors: Masaru Kawaguchi, Omuta (JP); Shigetoshi Kuma, Kurume (JP); Mamoru Tanaka, Fukuoka (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 298 days.

(21) Appl. No.: 12/438,750

(22) PCT Filed: Oct. 9, 2007

(86) PCT No.: PCT/JP2007/069659
§ 371 (c)(1),
(2), (4) Date: Feb. 25, 2009

(87) PCT Pub. No.: WO2008/047626
PCT Pub. Date: Apr. 24, 2008

(65) Prior Publication Data
US 2010/0010192 A1      Jan. 14, 2010

(30) Foreign Application Priority Data
Oct. 16, 2006 (JP) ................................ 2006-281020

(51) Int. Cl.
*C08G 18/00* (2006.01)
(52) U.S. Cl. .............................. 528/77; 528/374; 568/57
(58) Field of Classification Search .................... 528/77, 528/374; 568/57
See application file for complete search history.

(56) References Cited

U.S. PATENT DOCUMENTS
5,087,758 A    2/1992 Kanemura et al.

FOREIGN PATENT DOCUMENTS

| JP | 5-117355 | | 5/1993 |
|---|---|---|---|
| JP | 10-332901 | A | 12/1998 |
| JP | 2006-162926 | A | 6/2006 |
| JP | 2006162926 | * | 6/2006 |

OTHER PUBLICATIONS

Form PCT/ISA/210 (international Search Report) dated Dec. 25, 2007.
Non-English version of Form PCT/ISA/237 (Written Opinion of the International Searching Authority) dated Dec. 25, 2007.
Observations by Third Parties from European Patent Office issued in Applicant's corresponding European Patent Application No. 07 829 397.4 (EP2 075 271) dated Jun. 8, 2010.
Notification of Transmittal of Translation of the International Preliminary Report on Patentability (Form PCT/IB/338), International Preliminary Report on Patentability (Form PCT/IB/373), Written Opinion of the International Search Authority (Form PCT/ISA/237) mailed in corresponding International Patent Application No. PCT/JP2007/069659, Apr. 30, 2009, The International Bureau of WIPO, Geneva, CH.

* cited by examiner

*Primary Examiner* — Randy Gulakowski
*Assistant Examiner* — Shane Fang
(74) *Attorney, Agent, or Firm* — Buchanan Ingersoll & Rooney PC

(57) ABSTRACT

Disclosed is a process for producing effectively a high performance optical material (e.g. a lens) made of a polyurethane resin, which is transparent and colorless without a strain. In this process, the optical material is produced without causing striation or clouding by polymerizing a polymerizable composition comprising a polythiol compound and a polyiso(thio)cyanate compound, and characterized in that a water content in the composition is 10 to 300 ppm.

7 Claims, No Drawings

PROCESS FOR PRODUCING RESIN FOR OPTICAL MATERIAL

TECHNICAL FIELD

The present invention relates to a process for producing an optical material (e.g. a lens) made of a polyurethane resin having good optical properties by polymerizing a polymerizable composition composed of a polythiol compound and a polyiso(thio)cyanate compound.

BACKGROUND ART

Since a resin optical material is lighter and less fragile than an optical material made of an inorganic material and tintable, it has been recently rapidly accepted for various optical materials, such as a spectacle lens and a camera lens.

While, a resin for the optical material with higher performance has been demanded. More particularly, there has been a need for improvements toward a higher refractive index, a higher Abbe's number, a lower density and a higher heat resistance. Responding to such a need, various resins for the optical material have been developed and put into use.

Among others, various polyurethane resins have been proposed actively. The present inventors have also made many proposals concerning optical materials, such as a plastic lens, made of a polyurethane resin.

As one of the most representative resins of the polyurethane resin, a resin obtained by reacting a polythiol compound and a polyiso(thio)cyanate compound may be exemplified. The resin is transparent and colorless, has a high refractive index and a low dispersion property, and is excellent in properties, such as an impact strength, tintability and processability. Consequently, it is one of the best resins for the optical material such as a plastic lens. Among others, the resin transparency is a crucial property for a lens.

DISCLOSURE OF THE INVENTION

On some occasions during production of a resin for an optical material, striation or clouding may be caused in a resin or optical material obtained by polymerization. Such striation or clouding may deteriorate the performance of the optical material. Consequently, an object of the present invention is to provide a method for producing effectively a high performance, namely transparent and colorless without a strain, optical material (e.g. a lens) made of a polyurethane resin, without causing striation or clouding.

In order to attain the object, the present inventors have intensively studied to discover that there is a close relationship between the polymerization rate of the polymerizable composition, or presence of clouding or striation in a lens made of a polyurethane resin, and a water content in the polymerizable composition.

It becomes generally possible to produce a highly transparent lens without striation or clouding at a high yield by selecting a catalyst amount and a temperature rise pattern suitable for a particular lens form in the production of the lens. As well known, in the event a polymerization rate drops far below the normal rate, the occurrence rate of striation or clouding increases in general dramatically, which may cause frequently deterioration of the transparency of the resin. Meanwhile, the present inventors have discovered that, in case the water content of a polymerizable composition composed of a polythiol compound and a polyiso(thio)cyanate compound exceeds a certain value, the polymerization rate decreases slightly resulting in causing striation or clouding, which may lower the yield of the product. That is, it has been discovered that by maintaining the water content in the polymerizable composition within a certain range, the decrease of the polymerization rate was inhibited and a high performance polyurethane resin lens, that is transparent and colorless without clouding or striation, can be obtained, thereby completing the present invention.

According to a conventional art, it has been known that at a very high water content an iso(thio)cyanate compound reacts with the water, so that foaming or clouding of the resin should take place to lose transparency completely, and that industrial production of an optical material should become difficult. Absolutely different from such foaming and clouding phenomena caused by a very high content of water, the present invention is based on the discovery of a correlation between a water content in such an extremely low specific range (in the order of ppm) as has been believed to have no adverse influence on industrial production and a polymerization rate or striation or clouding caused therefrom. The correlation has been first discovered by the present inventors, and had not been known conventionally in the art.

Namely, an aspect of the present invention is a process for producing a resin for an optical material by polymerizing a polymerizable composition comprising a polythiol compound and a polyiso(thio)cyanate compound, characterized in that a water content in the composition is 10 to 300 ppm.

Other aspects of the present invention are a resin obtained by the process for producing, and an optical material such as a lens comprising the resin.

According to the present invention, a high performance optical material (e.g. a lens) made of a polyurethane resin, which is transparent and colorless without a strain, can be effectively produced at a high yield without causing striation or clouding.

BEST MODE FOR CARRYING OUT THE INVENTION

According to the present invention, a polyurethane resin for an optical material is produced by polymerizing a polymerizable composition composed of a polythiol compound and a polyiso(thio)cyanate compound. The water content of the polymerizable composition is in a range of 10 to 300 ppm. Although the water content below 10 ppm is permissible, it is difficult to lower the water content below 10 ppm, because of existence of moisture in raw material polythiol and moisture contamination in a production process at a mixing operation of a polythiol compound and a iso(thio)cyanate compound, and the like. Furthermore, the water content of the polymerizable composition is preferably 10 to 200 ppm.

To limit the water content to 10 to 300 ppm, it is necessary to decrease the water content to the extent possible at a monomer production stage. For example, if a solvent is used in monomer production, the water content can be lowered simultaneously with removal of the solvent by utilizing an azeotropic mixture with water. The water content in the monomer can be further decreased by removing the residual moisture in the system through flushing nitrogen under a reduced pressure at a room or elevated temperature. In case distillation can be applied for purification, the water content in the monomer can be lowered by adjusting the initial cut-off amount. The low water content can be maintained by storing the produced monomer under a nitrogen atmosphere preventing increase of the water content by absorption of moisture after the production of monomer.

In the present invention, it is important not only to decrease the water content in the monomer or the polymerizable composition according to the aforementioned techniques, but also to inspect the water content in the monomer or the polymerizable composition in order to judge whether the same can be utilized for polymerization. That is to say, in case the water content result according to the inspection should be within the range determined by the present invention, the monomer or the polymerizable composition is utilized for polymerization, but in case it should be outside the range, the same is not utilized for polymerization but additionally treated for decreasing the water content followed by reinspection to judge whether the same can be utilized for polymerization.

In case the water content in the polymerizable composition is within the determined range, substantial decrease in the polymerization rate does not take place and an optical material of a transparent polyurethane resin without striation and clouding can be obtained. Thereby, the water content in a polythiol compound to be used for the polymerizable composition is preferably 20 to 600 ppm, and more preferably 20 to 400 ppm from the viewpoint of suppressing striation and clouding. The water content can be measured by a Karl-Fisher moisture meter.

The polymerizable composition is a composition containing a polythiol compound and a polyiso(thio)cyanate compound as the main components. The composition may contain according to need additionally optional components, such as a catalyst, an internal release agent, a UV absorber and a bluing agent.

A polyurethane lens, for example, may be produced by casting a polythiol compound and a polyiso(thio)cyanate compound as well as an optional component as necessary into a lens mold followed by polymerization.

There is no particular restriction on a polyiso(thio)cyanate compound to be used for the polymerizable composition, insofar as it is a compound having 2 or more iso(thio)cyanate groups in the molecule. Herein the term "iso(thio)cyanate" means "isocyanate or isothiocyanate".

Specific examples of a polyiso(thio)cyanate compound include: aliphatic polyisocyanate compounds, such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl)carbonate, bis(isocyanatoethyl) ether, lysine diisocyanatomethyl ester, and lysine triisocyanate;

alicyclic polyisocyanate compounds, such as 2,5-bis(isocyanatomethyl)bicyclo[2.2.1]heptane, 2,6-bis(isocyanatomethyl)bicyclo[2.2.1]heptane, bis(isocyanatomethyl)cyclohexane, dicyclohexylmethane diisocyanate, and isophorone diisocyanate;

polyisocyanate compounds having an aromatic ring, such as 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenylisocyanate), 4,4'-methylene bis(2-methylphenylisocyanate), bibenzyl-4,4'-diisocyanate, bis(isocyanatophenyl)ethylene, bis(isocyanatomethyl)benzene, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl phenyl) ether, bis(isocyanatoethyl)phthalate, and 2,6-di(isocyanatomethyl)furan;

sulfur-containing aliphatic polyisocyanate compounds, such as bis(isocyanatomethyl)sulfide, bis(isocyanatoethyl) sulfide, bis(isocyanatopropyl)-sulfide, bis(isocyanatohexyl) sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio) methane, bis(isocyanatoethylthio)-methane, bis(isocyanatomethylthio)ethane, bis(isocyanatoethylthio) ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, and isocyanatoethylthio-2,6-dithia-1,8-octane diisocyanate;

aromatic sulfide polyisocyanate compounds, such as 2-isocyanatophenyl-4-isocyanatophenyl sulfide, bis(4-isocyanatophenyl)sulfide and bis(4-isocyanatomethyl phenyl)sulfide;

aromatic disulfide polyisocyanate compounds, such as bis (4-isocyanatophenyl)disulfide, bis(2-methyl-5-isocyanatophenyl)disulfide, bis(3-methyl-5-isocyanatophenyl) disulfide, bis(3-methyl-6-isocyanatophenyl)-disulfide, bis(4-methyl-5-isocyanatophenyl)disulfide, and bis(4-methoxy-3-isocyanatophenyl)disulfide;

sulfur-containing alicyclic polyisocyanate compounds, such as 2,5-diisocyanatotetrahydrothiophene, 2,5-diisocyanatomethyltetrahydrothiophene, 3,4-diisocyanatomethyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane and 4,5-diisocyanatomethyl-2-methyl-1,3-dithiolane;

aliphatic polyisothiocyanate compounds, such as 1,2-diisothiocyanatoethane and 1,6-diisothiocyanatohexane; alicyclic polyisothiocyanate compounds such as cyclohexanediisothiocyanate; aromatic polyisothiocyanate compounds, such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene bis(phenylisothiocyanate), 4,4'-methylene bis(2-methylphenylisothiocyanate), 4,4'-methylene bis(3-methylphenylisothiocyanate), 4,4'-diisothiocyanatobenzophenone, 4,4'-diisothiocyanato-3,3'-dimethylbenzophenone and bis(4-isothiocyanatophenyl) ether;

Furthermore, carbonylpolyisothiocyanate compounds, such as 1,3-benzenedicarbonyl diisothiocyanate, 1,4-benzenedicarbonyl diisothiocyanate and (2,2-pyridine)-4,4-dicarbonyl diisothiocyanate; sulfur-containing aliphatic polyisothiocyanate compounds, such as thiobis(3-isothiocyanatopropane), thiobis(2-isothiocyanatoethane) and dithiobis(2-isothiocyanatoethane);

sulfur-containing aromatic polyisothiocyanate compounds, such as 1-isothiocyanato-4-[(2-isothiocyanato)sulfonyl]benzene, thiobis(4-isothiocyanatobenzene), sulfonyl (4-isothiocyanatobenzene) and dithiobis(4-isothiocyanatobenzene); sulfur-containing alicyclic polyisothiocyanate compounds, such as 2,5-diisothiocyanatothiophene and 2,5-diisothiocyanato-1,4-dithiane; and polyiso(thio)cyanate compounds having an isocyanate group and an isothiocyanate group, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenyl sulfide and 2-isocyanatoethyl-2-isothiocyanatoethyl disulfide.

Furthermore, a halogenated substitution product, such as a chlorinated substitution product and a brominated substitution product, an alkylated substitution product, an alkoxylated substitution product, a nitrated substitution product, a prepolymer-type modified product with a polyhydric alcohol, a carbodiimide-modified product, a urea-modified product, a biuret-modified product, and a dimerized or trimerized product thereof may be used.

Notwithstanding the above, the polyiso(thio)cyanate compound is not limited to the exemplified compounds. The exemplified compounds may be used singly or in a combination of two or more thereof.

Among the exemplified compounds, especially at least one alicyclic isocyanate compound should be used preferably. As such an alicyclic isocyanate compound, at least one compound selected from the group consisting of 2,5-bis(isocyanatomethyl)bicyclo[2.2.1]heptane, 2,6-bis(isocyanatomethyl)bicyclo[2.2.1]heptane, bis(isocyanatomethyl)cyclohexane, dicyclohexylmethane diisocyanate and isophorone diisocyanate should be used preferably.

There is no particular restriction on a polythiol compound to be used for the polymerizable composition, insofar as it is a compound having 2 or more thiol groups in the molecule.

Specific examples of a polythiol compound include: aliphatic polythiol compounds, such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl) thiomalate, 2,3-dimercapto-1-propanol (2-mercaptoacetate), 2,3-dimercapto-1-propanol (3-mercaptopropionate), diethyleneglycol bis(2-mercaptoacetate), diethyleneglycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethyleneglycol bis(2-mercaptoacetate), ethyleneglycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate) and tetrakis(mercaptomethyl)-methane;

aromatic polythiol compounds, such as 1,2-dimercaptobenzene, 1,3-dimercaptobenzene, 1,4-dimercaptobenzene, 1,2-bis(mercaptomethyl)-benzene, 1,3-bis(mercaptomethyl)benzene, 1,4-bis(mercaptomethyl)benzene, 1,2-bis (mercaptoethyl)benzene, 1,3-bis(mercaptoethyl)benzene, 1,4-bis-(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris (mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane;

aromatic polythiol compounds containing a sulfur atom in addition to a mercapto group, such as 1,2-bis(mercaptoethylthio)benzene, 1,3-bis(mercaptoethylthio)benzene, 1,4-bis (mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene and 1,3,5-tris(mercaptoethylthio)-benzene, as well as nuclear alkylated derivatives thereof;

aliphatic polythiol compounds containing a sulfur atom in addition to a mercapto group, such as bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio)methane, bis(2-mercaptoethylthio)methane, bis(3-mercapto propylthio)methane, 1,2-bis(mercaptomethylthio)ethane, 1,2-bis(2-mercaptoethylthio)ethane, 1,2-bis(3-mercaptopropyl)ethane, 1,3-bis (mercaptomethylthio)propane, 1,3-bis(2-mercaptoethylthio) propane, 1,3-bis(3-mercaptopropylthio)propane, 1,2,3-tris (mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl 1,11-dimercapto-3,6,9-trithiaundecane, bis(mercaptomethyl)-3,6,9-trithia-1,11-undecaned ithiol, tetrakis(mercaptomethylthiomethyl)methane, tetrakis(2-mercaptoethylthiomethyl)methane, tetrakis(3-mercaptopropylthiomethyl) methane, bis(2,3-dimercaptopropyl) sulfide, bis(1,3-dimercaptopropyl) sulfide, 2,5-dimercapto-1,4-dithiane, 2,5-dimercaptomethyl-1,4-dithiane, 2,5-dimercapto methyl-2,5-dimethyl-1,4-dithiane, bis(mercaptomethyl) disulfide, bis (mercaptoethyl) disulfide and bis(mercaptopropyl) disulfide, as well as thioglycolates and mercaptopropionates ester thereof;

other aliphatic polythiol compounds containing an ester bond and a sulfur atom in addition to a mercapto group, such as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptoacetate), 1,4-dithiane-2,5-diol bis(3-mercaptopropionate), bis(2-mercaptoethyl)thiodiglycolate, bis(2-mercaptoethyl)thiodipropionate, bis(2-mercaptoethyl)-4,4-thiodibutyrate, bis(2-mercaptoethyl)dithiodiglycolate, bis(2-mercaptoethyl)dithiodipropionate, bis(2-mercaptoethyl)-4,4-dithiodibutyrate, bis(2,3-dimercaptopropyl)thiodiglycolate, bis(2,3-dimercaptopropyl)thiodipropionate, bis(2,3-dimercaptopropyl)dithiodiglycolate, and bis(2,3-dimercaptopropyl)dithiodipropionate;

heterocyclic compounds containing a sulfur atom in addition to a mercapto group, such as 3,4-thiophenedithiol, and 2,5-dimercapto-1,3,4-thiadiazole;

compounds containing a hydroxy group in addition to a mercapto group, such as 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris (3-mercaptopropionate), pentaerythritol mono(3-mercaptopriopionate), pentaerythritol bis(3-mercaptopropionate), pentaerythritol tris(thioglycolate), dipentaerythritol pentakis(3-mercaptopropionate), hydroxymethyltris(mercaptoethylthiomethyl)methane and 1-hydroxyethylthio-3-mercaptoethylthiobenzene;

compounds having a dithioacetal or dithioketal skeleton, such as 1,1,3,3-tetrakis(mercaptomethylthio)propane, 1,1,2,2-tetrakis(mercaptomethylthio) ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,2-bis(mercaptomethyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 4,6-bis(mercaptomethylthio)-1,9-dimercapto-2,5,8-trithianonane, 3-mercaptomethylthio-1,6-dimercapto-2,5-dithiahexane, 2-(2,2-bis(mercaptodimethylthio)ethyl)-1,3-dithiethane, 1,1,9,9-tetrakis(mercaptomethylthio)-5-(3,3-bis(mercaptomethylthio)-1-thiapropyl)-3,7-dithianonane, tris(2,2-bis(mercaptomethylthio)-ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-{bis(mercaptomethylthio)methyl}-3,4,12,13-tetrakis(mercaptomethylthio)-1,15-dimercapto-2,5,7,9,11,14-hexathiapentadecane, 4,6-bis{3,5-bis(mercaptomethylthio)-7-mercapto-2,6-dithiaheptylthio}-1,3-dithiane, 4-{3,5-bis-(mercaptomethylthio)-7-mercapto-2,6-dithiaheptylthio}-6-mercaptomethylthio-1,3-dithiane, 1,1-bis{4-(6-mercaptomethylthio)-1,3-dithianylthio}-3,3-bis(mercaptomethylthio)propane, 1,3-bis{4-(6-mercaptomethylthio)-1,3-dithianylthio}-1,3-bis(mercaptomethylthio)propane, 1-{4-(6-mercaptomethylthio)-1,3-dithianylthio}-3-{2,2-bis(mercaptomethylthio)ethyl}-7,9-bis(mercaptomethylthio)-2,4,6,10-tetrathiaundecane, 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}-methyl-5-mercapto-2,4-dithiapentylthio]-1,3-dithiane, 4,6-bis{4-(6-mercaptomethylthio)-1,3-dithianylthio}-1,3-dithiane, 4-{4-(6-mercaptomethylthio)-1,3-dithianylthio}-6-{4-(6-mercaptomethylthio)-1,3-dithianylthio}-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis-(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}-methyl-1,9-dimercapto2,4,6,8-tetrathianonane, 4-{3,4,8,9-tetrakis(mercaptomethylthio)-11-mercapto-2,5,7,10-tetrathiaundecyl}-5-mercaptomethylthio-1,3-dithiolane, 4,5-bis{3,4-bis(mercaptomethylthio)-6-mercapto-2,5-dithiahexylthio}-1,3-dithiolane, 4-{3,4-bis(mercaptomethylthio)-6-mercapto-2,5-dithiahexylthio}-5-mercaptomethylthio-1,3-dithiolane, 4-{3-bis(mercaptomethylthio)methyl-5,6-bis(mercaptomethylthio)-8-mercapto-2,4,7-trithiaoctyl}-5-mercaptomethylthio-1,3-dithiolane, 2-[bis{3,4-bis-mercaptomethylthio-6-mercapto-2,5-dithiahexylthio}methyl]-1,3-dithiethane, 2-{3,4-bis(mercaptomethylthio)-6-mercapto-2,5-dithiahexylthio}mercaptomethylthiomethyl-1,3-dithiethane, 2-{3,4,8,9-tetrakis(mercaptomethylthio)-11-mercapto-2,5,7,10-tetrathiaundecylthio}mercaptomethylthiomethyl-1,3-dithiethane, 2-{3-bis(mercaptomethylthio)methyl-5,6-bis(mercaptomethylthio)-8-mercapto-2,4,7-trithiaoctyl}mercaptomethylthiomethyl-1,3-dithiethane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 2-[bis{4-(5-mercaptomethylthio-1,3-dithiolanyl)thio}]methyl-1,3-dithiethane, and 4-{4-(5-mercaptomethylthio-1,3-dithiolanyl)thio}-5-[1-{2-(1,3-dithietanyl)}-3-mercapto-2-thiapropylthio]-1,3-dithiolane, as well as oligomers thereof;

compounds having a skeleton of an orthotrithioformate ester, such as tris(mercaptomethylthio)methane, tris(mercaptoethylthio)methane, 1,1,5,5-tetrakis(mercaptomethylthio)-2,4-dithiapentane, bis(4,4-bis(mercaptomethylthio)-1,3-dithiabutyl)(mercaptomethylthio)methane, tris(4,4-bis(mercaptomethylthio)-1,3-dithiabutyl)methane, 2,4,6-tris(mercaptomethylthio)-1,3,5-trithiacyclohexane, 2,4-bis(mercaptomethylthio)-1,3,5-trithiacyclo-hexane, 1,1,3,3-tetrakis(mercaptomethylthio)-2-thiapropane, bis(mercaptomethyl)methylthio-1,3,5-trithiacyclohexane, tris((4-mercaptomethyl-2,5-dithiacyclohexyl-1-yl)methylthio)methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris(2,2-bis(mercaptomethylthio)-1-thiaethyl)methane, tris(3,3-bis(mercaptomethylthio)-2-thiapropyl)methane, tris(4,4-bis(mercaptomethylthio)-3-thiabutyl)methane, 2,4,6-tris(3,3-bis(mercaptomethylthio)-2-thiapropyl)-1,3,5-trithiacyclohexane, and tetrakis(3,3-bis(mercaptomethylthio)-2-thiapropyl]-methane, as well as oligomers thereof; and compounds having an orthotetrathiocarbonic ester skeleton, such as 3,3'-di(mercaptomethylthio)-1,5-dimercapto-2,4-dithiapentane, 2,2'-di(mercaptomethylthio)-1,3-dithiacyclopentane, 2,7-di(mercaptomethyl)-1,4,5,9-tetrathiaspiro[4,4]nonane, and 3,9-dimercapto-1,5,7,11-tetrathiaspiro[5,5]-undecane, as well as oligomers thereof.

Notwithstanding the above, the polythiol compound is not limited to the exemplified compounds. The exemplified compounds may be used singly or in a combination of two or more thereof.

Among the exemplified compounds, at least one polythiol compound selected from the group consisting of 1,2-bis[(2-mercaptoethyl)thio]-3-mercaptopropane, bis(mercaptomethyl)-3,6,9-trithia-1, 11-undecanedithiol, pentaerythritol tetrakis(3-mercaptopropionate), 1,1,3,3-tetrakis(mercaptomethylthio)propane and 2-mercaptoethanol should preferably be used.

The usage ratio of a polythiol compound to a polyiso(thio)cyanate compound is normally in a range of SH group/NCO group=0.5 to 3.0, and preferably 0.6 to 2.0, further preferably 0.8 to 1.3.

In order to improve physical properties, handling properties and polymerization reactivity of the polyurethane resin, in addition to a polythiol compound and an iso(thio)cyanate compound that build the urethane resin, one or more compounds other than the raw materials forming urethane, such as an active hydrogen compound as represented by an amine, an epoxy compound, an olefin compound, a carbonate compound, an ester compound, a metal, a metal oxide, an organometallic compound and a mineral, may be added.

Furthermore according to a purpose, various substances, such as a chain extending agent, a cross-linking agent, a light stabilizer, a UV absorber, an antioxidant, an oil-soluble dye, a filler, a release agent, and a bluing agent, may be optionally added as in a publicly known molding process. To regulate the reaction rate at a desired level, S-alkyl thiocarbamate ester or a publicly known reaction catalyst used for producing polyurethane may be appropriately added.

An optical material composed of a polyurethane resin is in general produced by cast polymerization. More specifically, a polythiol compound and a polyiso(thio)cyanate compound are mixed, and optionally, as needed, degassed by an appropriate method. The mixture (a polymerizable composition) is then cast in a mold for an optical material, which is usually heated up gradually from a low temperature to a high temperature for polymerization, followed by demolding to obtain the optical material.

A polyurethane resin produced according to the process of the present invention has a high refractive index and a low dispersion property, is superior in heat resistance and durability, and enjoys favorable properties of light-weight and high impact-resistance as well as a good hue. Consequently the resin is suitable for optical materials, such as a lens and a prism, and especially good for use in a lens, such as a spectacle lens and a camera lens.

Furthermore, the optical material may be optionally subjected to a physical or chemical treatment, such as surface polishing, an antistatic treatment, hard coating, an anti-reflection coating, a tinting treatment and a photochromic treatment for a purpose of improvements by inhibiting reflection, imparting high hardness, improving abrasion resistance, improving chemical resistance, imparting an antifogging property or imparting fashionability.

The optical material made of the polyurethane resin according to the present invention is characterized by extremely rare striation or clouding. In other words, the optical material of the present invention is characterized in that it has excellent properties and can be produced at a high yield. As for specific measuring method of the occurrence rates of striation and clouding, 100 pieces of an optical material are visually inspected under a high-pressure mercury lamp. If a stria is observed the sample is judged to have striation, and if turbidity is observed the sample is judged to have clouding.

EXAMPLES

The present invention will be described in more detail by means of Examples. The water content in a polymerizable composition, the polymerization rate and the occurrence rates of striation and clouding of a resin are measured according to the following methods. Hereinafter "part(s)" means "part(s) by weight".

Water Content: It was measured by a Karl-Fisher moisture meter. More specifically an automatic moisture meter KF-100 (by Mitsubishi Chemical Corp.) and a water vaporizer VA-100 with a board (by Mitsubishi Chemical Corp.) were used.

Polymerization Rate: It was evaluated by defining the time of preparation of a polymerizable composition as time zero (0), and using as an index the viscosity at hour 7.

Occurrence Rate of Striation: The "striation" means a phenomenon of existence of localized difference from a normal refractive index of the surroundings due to nonuniformity of the composition, etc. The occurrence rate was determined in the Example using 100 lenses by judging a lens as having striation, in which a stria was identified by means of visual observation under a high-pressure mercury lamp.

Occurrence Rate of Clouding: It was determined using 100 lenses by judging a lens as having clouding, in which turbidity was identified by means of visual observation under a high-pressure mercury lamp.

Example 1

(Measurement of Viscosity of Polymerizable Composition)
At 10 to 15° C., 60 parts of dicyclohexylmethane diisocyanate, 0.05 parts of dimethyltin dichloride as a curing catalyst, 0.10 parts of acidic phosphate ester (Trade name: Zelec UN by Stepan Company), 0.05 parts of a UV absorber (Trade name: Viosorb 583 by Kyodo Chemical Co., Ltd.) were mixed and dissolved. Additionally, 40 parts of a polythiol composed of 1,2-bis[(2-mercaptoethyl)thio]-3-mercaptopropane as a main component was charged and mixed together to obtain a homogeneous liquid mixture (a polymerizable composition). The water content of the used polythiol was 50 ppm, and the water content of the polymerizable composition was 20 ppm. Defining the time of preparation of the homogeneous liquid mixture as time zero (0), the viscosity at hour 7 was measured. The result is shown in Table 1.

(Production of Plastic Lens)
At 10 to 15° C., 60 parts of dicyclohexylmethane diisocyanate, 0.05 parts of dimethyltin dichloride as a curing catalyst, 0.10 parts of acidic phosphate ester (Zelec UN), 0.05 parts of a UV absorber (Viosorb 583) were mixed and dissolved. Additionally, 40 parts of a polythiol composed of 1,2-bis[(2-mercaptoethyl)thio]-3-mercaptopropane as a main component was charged and mixed together to obtain a homogeneous liquid mixture (a polymerizable composition). The water content of the used polythiol was 50 ppm, and the water content of the polymerizable composition was 20 ppm. The homogeneous liquid mixture was degassed at 600 Pa for 1 hour and filtrated by a 1 μm PTFE (polytetrafluoroethylene) filter. The liquid was then cast into a lens mold constituted of a glass mold of diameter 75 mm for −4D and a tape. The mold was then placed in an oven, whose temperature was kept at 40° C. for 2 hours, raised to 50° C. over 4 hours, kept there for 2 hours, raised to 60° C. over 3 hours, and kept there for 2 hours. The temperature was further raised to 70° C. over 3 hours, kept there for 2 hours, raised to 100° C. over 3 hours, then further raised to 130° C. over 1 hour, and kept there for 2 hours. As described above, the polymerization was carried out in the temperature range of 40° C. to 130° C. for totally 24 hours. After the completion of the polymerization, the mold was removed from the oven and the lens was demolded. Then the obtained lens was further annealed at 120° C. for 3 hours. One hundred (100) lenses were produced as above and the striation occurrence rate and the clouding occurrence rate were determined. The results are shown in Table 1.

Example 2

Except that a polymerizable composition with the water content of 100 ppm was used instead of the polymerizable composition used in Example 1, the measurement of the viscosity of the polymerizable composition and the production of the plastic lens were carried out identically to Example 1. The results are shown in Table 1.

Example 3

Except that a polymerizable composition with the water content of 200 ppm was used instead of the polymerizable composition used in Example 1, the measurement of the viscosity of the polymerizable composition and the production of the plastic lens were carried out identically to Example 1. The results are shown in Table 1.

Example 4

Except that a polymerizable composition with the water content of 300 ppm was used instead of the polymerizable composition used in Example 1, the measurement of the viscosity of the polymerizable composition and the production of the plastic lens were carried out identically to Example 1. The results are shown in Table 1.

Example 5

(Measurement of Viscosity of Polymerizable Composition)

At 10 to 15° C., 50.6 parts of a mixture of 2,5-bis(isocyanatomethyl)-bicyclo[2.2.1]heptane and 2,6-bis(isocyanatomethyl)bicyclo[2.2.1]heptane, 0.06 parts of dibutyltin dichloride as a curing catalyst, 0.12 parts of acidic phosphate ester (Zelec UN), 0.05 parts of a UV absorber (Viosorb 583) were mixed and dissolved. Additionally, 25.5 parts of a polythiol composed of 1,2-bis[(2-mercaptoethyl)thio]-3-mercaptopropane as a main component and 23.9 parts of pentaerythritol tetrakis(mercaptopropionate) were charged respectively and mixed together to obtain a homogeneous liquid mixture (a polymerizable composition). The water content of the used polythiol composed of 1,2-bis[(2-mercaptoethyl)thio]-3-mercaptopropane as a main component was 40 ppm, the water content of pentaerythritol tetrakis(mercapto-propionate) was 20 ppm and the water content of the polymerizable composition was 15 ppm. Defining the time of preparation of the homogeneous liquid mixture as time zero (0), the viscosity at hour 7 was measured. The result is shown in Table 1.

(Production of Plastic Lens)

At 10 to 15° C., 50.6 parts of a mixture of 2,5-bis(isocyanatomethyl)bicyclo[2.2.1]heptane and 2,6-bis(isocyanatomethyl)-bicyclo[2.2.1]heptane, 0.06 parts of dibutyltin dichloride as a curing catalyst, 0.12 parts of acidic phosphate ester (Zelec UN), 0.05 parts of a UV absorber (Viosorb 583) were mixed and dissolved. Additionally, 25.5 parts of a polythiol composed of 1,2-bis[(2-mercaptoethyl)thio]-3-mercaptopropane as a main component and 23.9 parts of pentaerythritol tetrakis(mercapto-propionate) were charged respectively and mixed together to obtain a homogeneous liquid mixture (a polymerizable composition). The water content of the used polythiol composed of 1,2-bis[(2-mercaptoethyl)thio]-3-mercapto-propane as a main component was 40 ppm, the water content of pentaerythritol tetrakis(mercaptopropionate) was 20 ppm and the water content of the polymerizable composition was 15 ppm. The homogeneous liquid mixture was degassed at 600 Pa for 1 hour and filtrated by a 1 µm PTFE filter. The liquid was then cast into a lens mold constituted of a glass mold of diameter 75 mm for-4D and a tape. The mold was then placed in an oven, whose temperature was kept at 40° C. for 2 hours, raised to 50° C. over 4 hours, kept there for 2 hours, raised to 60° C. over 3 hours, and kept there for 2 hours. The temperature was further raised to 70° C. over 3 hours, kept there for 2 hours, raised to 100° C. over 3 hours, then further raised to 130° C. over 1 hour, and kept there for 2 hours. As described above, the polymerization was carried out in the temperature range of 40° C. to 130° C. for totally 24 hours. After the completion of the polymerization, the mold was removed from the oven and the lens was demolded. Then the obtained lens was annealed at 120° C. for 3 hours. One hundred (100) lenses were produced as above and the striation occurrence rate and the clouding occurrence rate were determined. The results are shown in Table 1.

Example 6

Except that a polymerizable composition with the water content of 150 ppm was used instead of the polymerizable composition used in Example 5, the measurement of the viscosity of the polymerizable composition and the production of the plastic lens were carried out identically to Example 5. The results are shown in Table 1.

Example 7

Except that a polymerizable composition with the water content of 300 ppm was used instead of the polymerizable composition used in Example 5, the measurement of the viscosity of the polymerizable composition and the production of the plastic lens were carried out identically to Example 5. The results are shown in Table 1.

Example 8

(Measurement of Viscosity of Polymerizable Composition)

At 10 to 15° C., 49.7 parts of a mixture of 2,5-bis(isocyanatomethyl)-bicyclo[2.2.1]heptane and 2,6-bis(isocyanatomethyl)bicyclo[2.2.1]heptane, 0.03 parts of dibutyltin dichloride as a curing catalyst, 0.12 parts of acidic phosphate ester (Zelec UN), 0.05 parts of a UV absorber (Viosorb 583) were mixed and dissolved. Additionally, 25.9 parts of a polythiol composed of bis(mercaptomethyl)-3,6,9-trithia-1,11-undecanedithiol as a main component and 24.4 parts of pentaerythritol tetrakis(mercaptopropionate) were charged respectively and mixed together to obtain a homogeneous liquid mixture (a polymerizable composition). The water content of the used polythiol composed of bis(mercaptomethyl)-3,6,9-trithia-1,11-undecanedithiol as a main component was 70 ppm, the water content of pentaerythritol tetrakis (mercaptopropionate) was 20 ppm and the water content of the polymerizable composition was 21 ppm. Defining the time of preparation of the homogeneous liquid mixture as time zero (0), the viscosity at hour 7 was measured. The result is shown in Table 1.

(Production of Plastic Lens)

At 10 to 15° C., 50.6 parts of a mixture of 2,5-bis(isocyanatomethyl)-bicyclo[2.2.1]heptane and 2,6-bis(isocyanatomethyl)bicyclo[2.2.1]heptane, 0.06 parts of dibutyltin dichloride as a curing catalyst, 0.12 parts of acidic phosphate ester (Zelec UN), 0.05 parts of a UV absorber (Viosorb 583) were mixed and dissolved. Additionally, 25.5 parts of a polythiol composed of bis(mercaptomethyl)-3,6,9-trithia-1,11-undecanedithiol as a main component and 23.9 parts of pentaerythritol tetrakis (mercaptopropionate) were charged respectively and mixed together to obtain a homogeneous liquid mixture (a polymerizable composition). The water content of the used polythiol composed of bis(mercaptomethyl)-3,6,9-trithia-1,11-undecanedithiol as a main component was 70 ppm, the water content of pentaerythritol tetrakis (mercaptopropionate) was 20 ppm and the water content of the polymerizable composition was 21 ppm. The homogeneous liquid mixture was degassed at 600 Pa for 1 hour and filtrated by a 1 µm PTFE filter. The liquid was then cast into a lens mold constituted of a glass mold of diameter 75 mm for-4D and a tape. The mold was then placed in an oven, whose temperature was kept at 40° C. for 2 hours, raised to 50° C. over 4 hours, kept there for 2 hours, raised to 60° C. over 3 hours, and kept there for 2 hours. The temperature was further raised to 70° C. over 3 hours, kept there for 2 hours, raised to 100° C. over 3 hours, then further raised to 130° C. over 1 hour, and kept there for 2 hours. As described above, the polymerization was carried out in the temperature range of 40° C. to 130° C. for totally 24 hours. After the completion of the polymerization, the mold was removed from the oven and the lens was demolded. Then the obtained lens was annealed at 120° C. for 3 hours. One hundred (100) lenses were produced as above and the striation occurrence rate and the clouding occurrence rate were determined. The results are shown in Table 1.

Example 9

Except that a polymerizable composition with the water content of 150 ppm was used instead of the polymerizable composition used in Example 8, the measurement of the viscosity of the polymerizable composition and the production of the plastic lens were carried out identically to Example 8. The results are shown in Table 1.

Example 10

Except that a polymerizable composition with the water content of 300 ppm was used instead of the polymerizable composition used in Example 8, the measurement of the viscosity of the polymerizable composition and the production of the plastic lens were carried out identically to Example 8. The results are shown in Table 1.

Comparative Example 1

Except that a polymerizable composition with the water content of 500 ppm was used instead of the polymerizable composition used in Example 1, the measurement of the viscosity of the polymerizable composition and the production of the plastic lens were carried out identically to Example 1. The results are shown in Table 1.

Comparative Example 2

Except that a polymerizable composition with the water content of 1,000 ppm was used instead of the polymerizable composition used in Example 1, the measurement of the viscosity of the polymerizable composition and the production of the plastic lens were carried out identically to Example 1. The results are shown in Table 1.

Comparative Example 3

Except that a polymerizable composition with the water content of 500 ppm was used instead of the polymerizable composition used in Example 5, the measurement of the viscosity of the polymerizable composition and the production of the plastic lens were carried out identically to Example 5. The results are shown in Table 1.

Comparative Example 4

Except that a polymerizable composition with the water content of 500 ppm was used instead of the polymerizable composition used in Example 8, the measurement of the viscosity of the polymerizable composition and the production of the plastic lens were carried out identically to Example 8. The results are shown in Table 1.

TABLE 1

| | | | Resin Properties | |
|---|---|---|---|---|
| | Water Content (ppm) | Viscosity at Hour 7 (mPa·s) | Striation Occurrence Rate (%) | Clouding Occurrence Rate (%) |
| Example 1 | 20 | 340 | 3 | 2 |
| Example 2 | 100 | 304 | 2 | 1 |
| Example 3 | 200 | 243 | 6 | 8 |
| Example 4 | 300 | 205 | 15 | 12 |
| Example 5 | 15 | 300 | 3 | 1 |
| Example 6 | 150 | 230 | 5 | 2 |
| Example 7 | 300 | 175 | 10 | 11 |
| Example 8 | 21 | 170 | 4 | 2 |
| Example 9 | 150 | 128 | 6 | 3 |
| Example 10 | 300 | 113 | 11 | 12 |
| Comparative Example 1 | 500 | 161 | 52 | 45 |
| Comparative Example 2 | 1000 | 111 | 60 | 57 |
| Comparative Example 3 | 500 | 130 | 51 | 43 |
| Comparative Example 4 | 500 | 98 | 51 | 47 |

The occurrence rates of striation and clouding of a resin obtained from a polymerizable composition with the low water content using an appropriate catalyst amount and polymerization profile are 0 to about 15%. From the results of Examples and Comparative Examples, it was confirmed that with the increase of the water content in the polymerizable composition the polymerization rate decreased and the viscosity at hour 7 decreased. As the result, the striation occurrence rate and the clouding occurrence rate increased, which increase changed dramatically beyond the threshold water content of 300 ppm. It is so considered that mismatch between a polymerization recipe and a polymerization rate should arise, if the water content exceeds a certain level, which results in increase of the striation occurrence rate and the clouding occurrence rate. In case of this polymerizable composition, if the water content is higher than 300 ppm, the viscosity at hour 7 is about 60% compared to the viscosity obtained from a lower water content, which indicates that the decrease of the polymerization rate should be limited to such level in order to inhibit striation or clouding. In other words, it has been found that by use of a polymerizable composition with the water content of 10 to 300 ppm, a highly transparent polyurethane resin can be provided.

INDUSTRIAL APPLICABILITY

A polyurethane resin to be obtained by reacting a polythiol compound and a polyiso(thio)cyanate compound is transparent and colorless, has a high refractive index and a low dispersion property, is excellent in an impact strength, tintability and processability, and therefore constitutes one of the most suitable resins for a plastic lens. Among others, the resin properties of transparency and good hue are crucial. The present invention provides a transparent and high performance optical material securing such crucial properties for an optical material such as a lens stably at a high yield, contributing to development of the relevant art.

The invention claimed is:
1. A process for producing a resin for an optical material by polymerizing a polymerizable composition comprising a polythiol compound and a polyiso(thio)cyanate compound, characterized in that a water content in the composition is 10 to 300 ppm, wherein prior to the polymerization a water content in the polythiol compound is 20 to 600 ppm.

2. The process for producing a resin for an optical material according to claim 1, wherein the polythiol compound comprises at least one compound selected from the group consisting of 1,2-bis[(2-mercaptoethyl)thio]-3-mercaptopropane, bis(mercaptomethyl)-3,6,9-trithia-1,11-undecanedithiol, pentaerythritol tetrakis(3-mercaptopropionate), 1,1,3,3-tetrakis(mercaptomethylthio)propane and 2-mercaptoethanol; and the iso(thio)cyanate compound comprises at least one alicyclic isocyanate compound.

3. The process for producing a resin for an optical material according to claim 2, wherein the alicyclic isocyanate compound comprises at least one compound selected from the group consisting of 2,5-bis(isocyanatomethyl)-bicyclo[2.2.1]heptane, 2,6-bis(isocyanatomethyl)bicyclo[2.2.1]-heptane, bis(isocyanatomethyl)cyclohexane, dicyclohexylmethane diisocyanate and isophorone diisocyanate.

4. The process for producing a resin for an optical material according to claim 1, wherein the optical material is a lens.

5. A resin for an optical material to be obtained by the process according to claim 1.

6. An optical material comprising the resin according to claim 5.

7. A lens comprising the resin according to claim 5.

* * * * *